United States Patent
Cho et al.

(10) Patent No.: US 12,264,617 B2
(45) Date of Patent: Apr. 1, 2025

(54) DME-FUELED GENERATOR

(71) Applicant: BIO FRIENDS INC., Daejeon (KR)

(72) Inventors: Wonjun Cho, Gyeonggi-do (KR); Jeseol Lee, Daejeon (KR); Youngsoo Lee, Chungcheongbuk-do (KR); Wonaje Cho, Seoul (KR); Hyejin Yu, Daejeon (KR); Junwoo Lee, Daejeon (KR)

(73) Assignee: BIO FRIENDS INC., Daejeon (KR)

( * ) Notice: Subject to any disclaimer, the term of this patent is extended or adjusted under 35 U.S.C. 154(b) by 0 days.

(21) Appl. No.: 18/681,390

(22) PCT Filed: Aug. 25, 2022

(86) PCT No.: PCT/KR2022/012717
§ 371 (c)(1),
(2) Date: Feb. 5, 2024

(87) PCT Pub. No.: WO2023/033454
PCT Pub. Date: Mar. 9, 2023

(65) Prior Publication Data
US 2024/0352887 A1    Oct. 24, 2024

(30) Foreign Application Priority Data
Sep. 3, 2021  (KR) .......... 10-2021-0117741

(51) Int. Cl.
F02M 21/02  (2006.01)
F02B 43/10  (2006.01)
F02B 63/04  (2006.01)
F02B 77/00  (2006.01)

(52) U.S. Cl.
CPC .............. *F02B 63/04* (2013.01); *F02B 43/10* (2013.01); *F02B 2063/045* (2013.01); *F02B 2077/06* (2013.01)

(58) Field of Classification Search
CPC ....... F02B 63/044; F02B 3/06; F02B 2275/14
USPC ......................................................... 123/525
See application file for complete search history.

(56) References Cited

U.S. PATENT DOCUMENTS 5,755,210 A  *  5/1998  Sato .................... F02M 25/089
                                                        123/529
6,457,460 B1 * 10/2002  Doane .................... F02M 31/20
                                                        123/514
6,786,085 B1 *  9/2004  Kroiss ................ F02M 37/0058
                                                        73/114.43

(Continued)

FOREIGN PATENT DOCUMENTS

JP       2011-106469 A   6/2011
KR       20-0331897 Y1  10/2003

(Continued)

OTHER PUBLICATIONS

International Search Report from corresponding Patent Application No. PCT/KR2022/012717 dated Dec. 15, 2022.

*Primary Examiner* — Long T Tran
*Assistant Examiner* — James J Kim
(74) *Attorney, Agent, or Firm* — Christensen, Fonder, Dardi PLLC; Diane E. Bennett; Peter S. Dardi

(57) ABSTRACT

The present invention relates to a dimethyl ether-fueled (DME-fueled) generator. Since the DME-fueled generator uses DME which is a clean fuel, there is no fine dust in the exhaust gas.

7 Claims, 3 Drawing Sheets

(56) References Cited

U.S. PATENT DOCUMENTS

| | | | | |
|---|---|---|---|---|
| 7,246,606 | B2* | 7/2007 | Tokumaru | F02D 19/027 |
| | | | | 123/514 |
| 11,850,936 | B2* | 12/2023 | Leidefeldt | B60K 15/07 |
| 2002/0189589 | A1* | 12/2002 | Kato | F02M 59/442 |
| | | | | 123/461 |
| 2003/0110780 | A1* | 6/2003 | Enomoto | F02M 21/0254 |
| | | | | 62/7 |
| 2008/0017170 | A1* | 1/2008 | Moroi | F02M 21/00 |
| | | | | 123/456 |
| 2010/0017099 | A1* | 1/2010 | Becker | F02D 41/2464 |
| | | | | 701/103 |
| 2013/0032124 | A1* | 2/2013 | Jang | F02M 37/0052 |
| | | | | 123/456 |
| 2013/0299404 | A1* | 11/2013 | Nakamura | B01J 39/00 |
| | | | | 210/172.1 |
| 2017/0306917 | A1* | 10/2017 | Kim | F02M 26/44 |
| 2022/0290636 | A1* | 9/2022 | Cho | F02M 21/0206 |
| 2023/0307992 | A1* | 9/2023 | Zhao | F01N 3/2066 |

FOREIGN PATENT DOCUMENTS

| | | |
|---|---|---|
| KR | 10-0751558 B1 | 8/2007 |
| KR | 10-2085056 B1 | 3/2020 |
| KR | 10-2115166 B1 | 5/2020 |

\* cited by examiner

DME-FUELED GENERATOR

CROSS REFERENCE TO RELATED APPLICATIONS

The present application is a National Stage filing of PCT Application No. PCT/KR2022/012717 filed Aug. 25, 2022, entitled "DME-Fueled Generator", which claims the benefit of priority based on Korean Patent Application No. 10-2021-0117741 filed on Sep. 3, 2021, the entire disclosure of which is incorporated as a part of this specification.

The present disclosure relates to a DME-fueled generator, and to a DME-fueled generator in which there is no fine dust in exhaust gas by using dimethyl ether (DME) which is a clean fuel.

BACKGROUND ART

The development of environmentally friendly energy sources is now a global trend, and many countries are developing mid- to long-term plans for new energy technology development. Specifically, the focus is on developing environmentally friendly systems such as improving new energy technology development system technology, improving exhaust gas control technology, and converting clean energy.

Among them, a technology for converting natural gas, a clean energy source, into other energy sources is highly evaluated for its potential for the development of new fuel energy, and one of these is dimethyl ether (DME) manufactured from various raw materials (natural gas, landfill gas, biogas, biomass, coal, etc.).

DME manufactured from various raw materials has recently been in the spotlight as a transportation energy (fuel), and it has characteristics that may compensate for most of the physical and chemical shortcomings of natural gas as a fuel, thereby attracting attention as an important next-generation fuel.

In particular, from the perspective of transportation fuel, the use of DME is considered as one of the clean energy sources because it may satisfy the environmental regulations of the new ultra low emission vehicle (ULEV) by significantly lowering the amount of exhaust gases such as nitrogen oxides and unreacted hydrocarbons compared to existing gasoline and diesel fuel.

In addition, DME has recently been attracting attention as a fuel to replace diesel, and as one of them, technology is being developed to replace diesel with DME in power generation systems using diesel engines, etc.

Since DME may be easily manufactured from biogas and there is no fine dust in the exhaust gas, the development of a power generation system replaced by DME is essential from an environmental perspective.

DISCLOSURE OF THE INVENTION

Technical Goals

The present disclosure relates to a DME-fueled generator, and is to provide a DME-fueled generator with no fine dust in exhaust gas by using dimethyl ether (DME) which is a clean fuel.

Technical objects to be achieved by the present disclosure are not limited to the technical objects mentioned above, and other technical objects that are not mentioned will be clearly understood by those skilled in the art from the description below.

Technical Solutions

A dimethyl ether (DME)-fueled generator of the present disclosure may include:
 a power generation unit configured to generate electricity by receiving driving force;
 a DME engine configured to generate the driving force by burning DME fuel; and
 a DME supply unit configured to supply the DME fuel to the DME engine.

Advantageous Effects

A DME-fueled generator of the present disclosure is driven by DME which is a clean fuel, and may generate electricity without generating environmental pollutants such as fine dust.

BEST MODE FOR CARRYING OUT THE INVENTION

Figure 1:
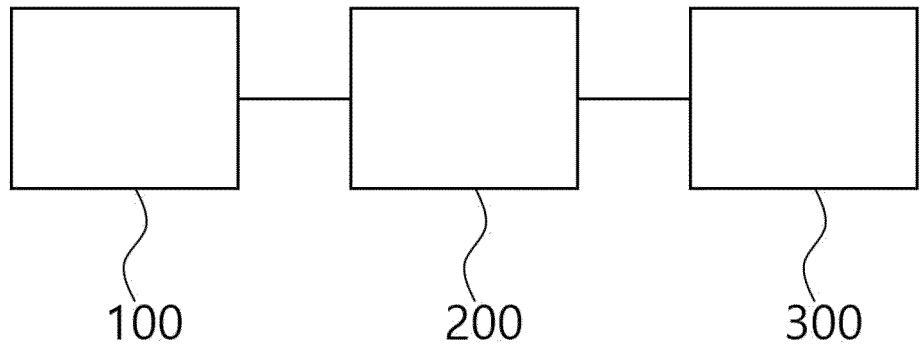
FIG. 1 is a block diagram illustrating a DME-fueled generator of the present disclosure.

A dimethyl ether (DME)-fueled generator of the present disclosure may include:
 a power generation unit configured to generate electricity by receiving driving force;
 a DME engine configured to generate the driving force by burning DME fuel; and
 a DME supply unit configured to supply the DME fuel to the DME engine.

The DME-fueled generator of the present disclosure may further include:
 a radiator unit configured to discharge heat generated from the DME engine to atmosphere;
 an exhaust pipe configured to discharge combustion gas generated from the DME engine; and
 a controller configured to control the power generation unit.

The DME-fueled generator of the present disclosure may further include a frame unit and the power generation unit, the DME engine, the radiator unit, and the controller may be mounted on an upper surface of the frame unit.

In the DME-fueled generator of the present disclosure, the frame unit may include a damper, wherein the damper may be configured to prevent vibration of ground from being transmitted to the power generation unit, the DME engine, the radiator unit, and the controller.

In the DME-fueled generator of the present disclosure, the DME engine may be arranged so that one end faces the radiator unit, the power generation unit may be arranged so that one end faces the other end of the DME engine, and the controller may be arranged so that one end faces the other end of the power generation unit.

In the DME-fueled generator of the present disclosure, the DME supply unit may include:
 a DME fuel tank in which the DME fuel is stored;

a DME injection unit configured to inject the DME fuel into the DME engine by receiving the DME fuel from the DME fuel tank;

a DME supply line which is a flow path configured to deliver the DME fuel in the DME fuel tank to the DME injection unit in a liquid state;

a DME recovery line configured to recover the DME fuel remaining in the DME injection unit in a state in which gaseous and liquid states coexist;

a DME fuel tank valve provided in the DME supply line and configured to open or block the DME fuel discharged from the DME fuel tank;

a DME fuel filter provided downstream of the DME fuel tank valve in the DME supply line and configured to remove impurities in the DME fuel;

a DME feed pump provided downstream of the DME fuel filter in the DME supply line and configured to deliver the DME fuel to the DME injection unit;

a DME fuel accumulator provided downstream of the DME feed pump in the DME supply line and configured to reduce pulsation caused by the DME feed pump;

a DME fuel pressure regulator provided downstream of the DME fuel accumulator in the DME supply line;

a DME fuel solenoid valve provided downstream of the DME fuel pressure regulator in the DME supply line;

a DME fuel cooler provided in the DME recovery line to cool the recovered DME fuel; and a DME fuel purge unit provided in the DME recovery line to purge a portion of the recovered DME fuel.

In the DME-fueled generator of the present disclosure, the DME supply unit may further include a DME feed pump cooler configured to cool the DME feed pump.

In the DME-fueled generator of the present disclosure, the DME recovery line may be connected to the DME fuel tank at a position higher than a liquid level formed by the DME fuel in the liquid state stored inside the DME fuel tank.

In the DME-fueled generator of the present disclosure, the DME supply line may be connected to the DME fuel tank at a position lower than the liquid level formed by the DME fuel in the liquid state stored inside the DME fuel tank.

In the DME-fueled generator of the present disclosure, a plurality of DME fuel tank valves may be provided, and the plurality of DME fuel tank valves may be connected in parallel on the DME supply line.

MODES FOR CARRYING OUT THE INVENTION

Hereinafter, embodiments according to the present disclosure will be described in detail with reference to the accompanied drawings. In this process, the size or shape of the components shown in the drawings may be exaggerated for clarity and convenience of explanation. In addition, terms specifically defined in consideration of the configuration and operation of the present disclosure may vary depending on the intention or custom of a user or an operator. Definitions of these terms should be made based on the content throughout this specification.

In the description of the present disclosure, it should be noted that an orientation or positional relationship indicated by the terms such as "center", "upper", "lower", "left", "right", "vertical", "horizontal", "inner side", "outer side", "one side", and "other side" is based on an orientation or positional relationship shown in a drawing or an orientation or positional relationship that is placed when using the product of the present disclosure on a daily basis, and is merely for explanation and brief description of the present disclosure, and it does not suggest or imply that the displayed device or element must necessarily be configured or operated in a specified orientation and should not be construed as limiting the present disclosure.

Figure 2:
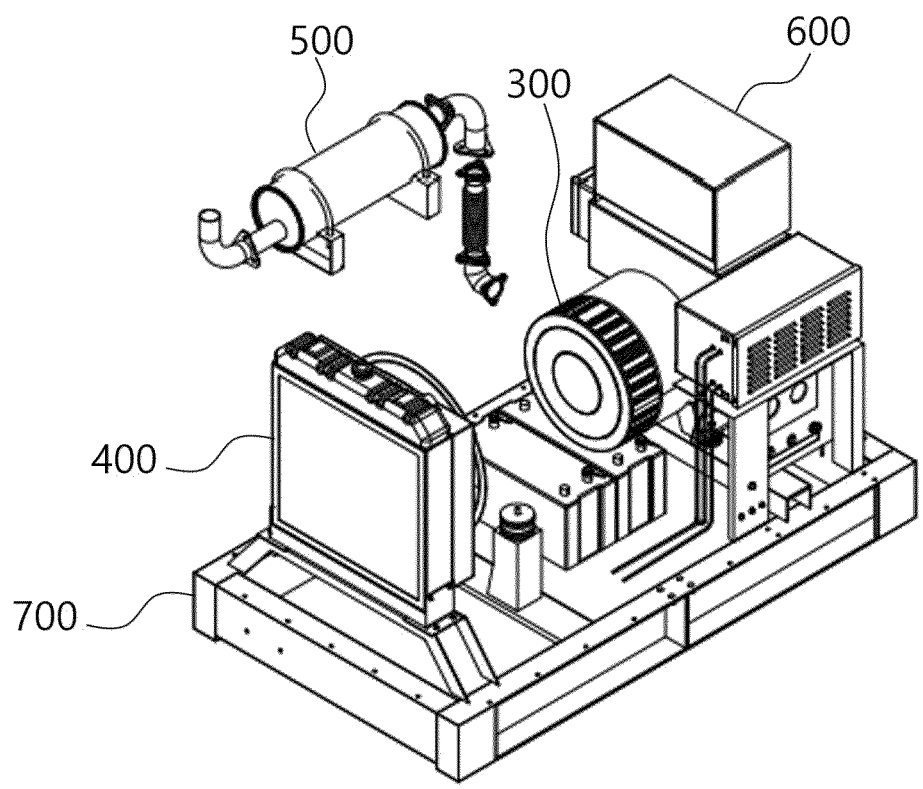
FIG. 2 is an exploded perspective view illustrating a DME-fueled generator of the present disclosure.
Figure 3:
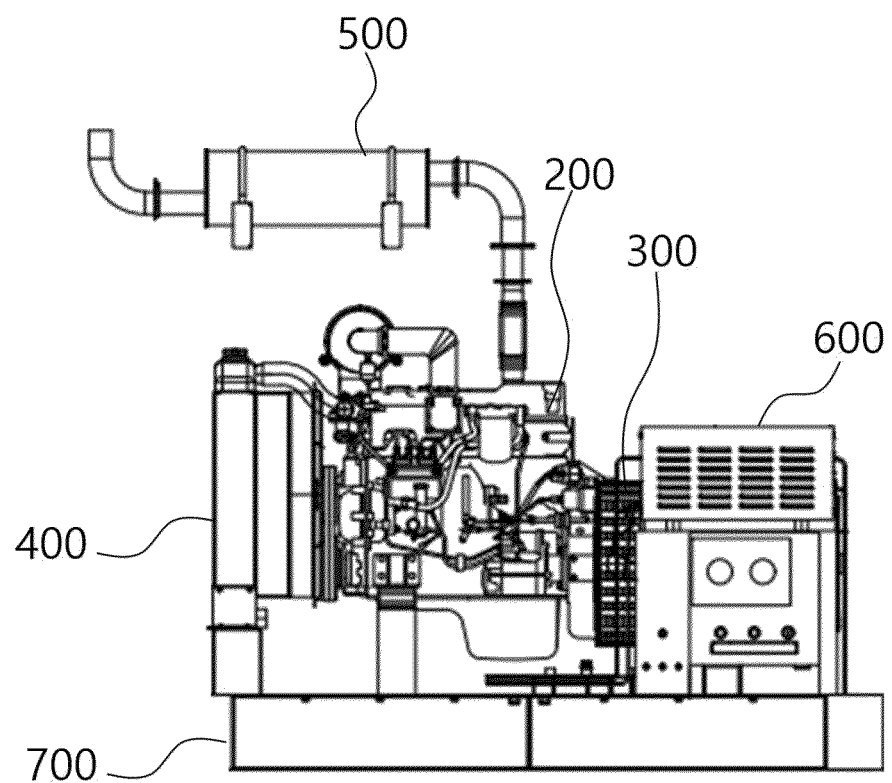
FIG. 3 is a plan view illustrating a DME-fueled generator of the present disclosure.
Figure 4:
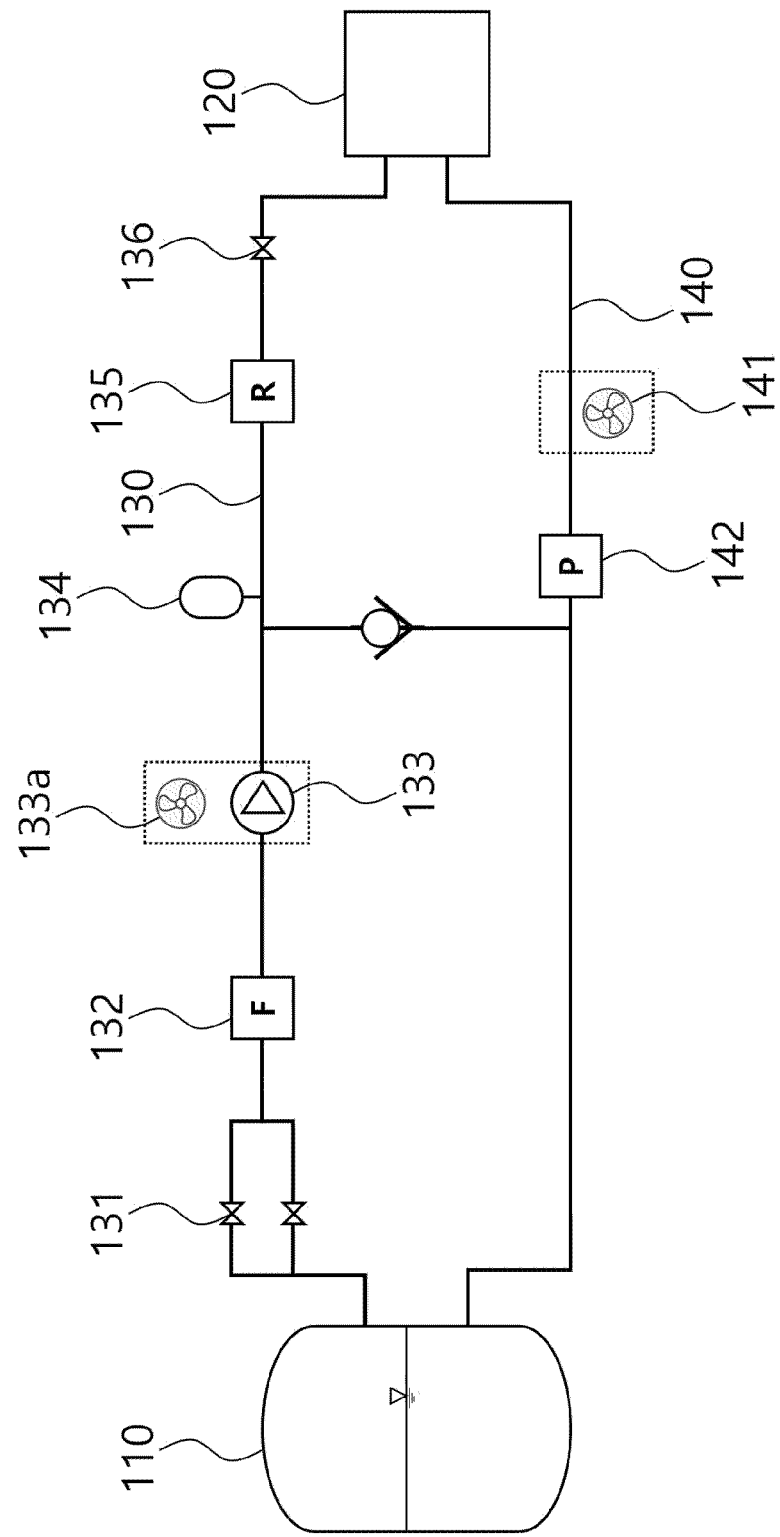
FIG. 4 is a schematic diagram illustrating a DME supply unit.

FIG. 1 is a block diagram illustrating a DME-fueled generator of the present disclosure. FIG. 2 is an exploded perspective view illustrating the DME-fueled generator of the present disclosure. FIG. 3 is a plan view illustrating the DME-fueled generator of the present disclosure. FIG. 4 is a schematic diagram illustrating a DME supply unit 100.

Hereinafter, with reference to FIGS. 1 to 4, the DME-fueled generator of the present disclosure will be described in detail.

As shown in FIG. 1, the DME-fueled generator of the present disclosure may include a power generation unit 300 configured to generate electricity by receiving driving force; a DME engine 200 configured to generate the driving force by burning dimethyl ether (DME) fuel; and a DME supply unit configured to supply the DME fuel to the DME engine 200.

The power generation unit 300 may be an alternator that converts rotational driving force into electricity. More specifically, it may be a three-phase synchronous generator that converts driving force rotating at synchronous speed into electrical energy.

The power generation unit 300 includes a rotor and a stator, and the rotor may share a rotation axis of the DME engine 200.

The DME engine 200 may burn the DME fuel to generate mechanical kinetic energy. The DME engine 200 generates rotational driving force, and the generated rotational driving force may be transmitted to the power generation unit 300.

A combustion chamber is provided inside the DME engine 200, and DME fuel may be injected into the combustion chamber. DME fuel may be injected into the combustion chamber of the DME engine 200 by an injector of the DME injection unit 120, which will be described later.

As shown in FIG. 2, the DME fueled-generator of the present disclosure may include:

a radiator unit 400 configured to discharge heat generated from the DME engine 200 to the atmosphere;

an exhaust pipe 500 configured to discharge combustion gas generated from the DME engine 200; and a controller 600 configured to control the power generation unit 300.

The radiator unit 400 may discharge some of the heat generated from the DME engine 200 into the atmosphere through coolant.

The exhaust pipe 500 may be for exhausting high-temperature combustion gas generated from the DME engine 200. The exhaust pipe 500 may be equipped with a reduction device to reduce pollutants and a silencer to remove noise.

The controller 600 may control the amount of DME fuel supplied to the DME engine 200, the temperature of the DME engine 200, the rotation speed of the power generation unit 300, and etc.

The DME-fueled generator of the present disclosure may further include a frame unit 700 and the power generation unit 300, the DME engine 200, the radiator unit 400, and the controller 600 may be mounted on an upper surface of the frame unit 700.

The frame unit 700 may include a damper, wherein the damper may prevent vibration of the ground from being transmitted to the power generation unit 300, the DME engine 200, the radiator unit 400 and the controller 600. In other words, the frame unit 700 may be an earthquakeresistant facility. The damper may be a shock absorber. The frame unit 700 may not only prevent vibration of the ground from being transmitted to the generator, and the like, but also prevent vibration of the generator from being transmitted to the building or the ground where the DME-fueled generator is installed.

As shown in FIGS. 2 and 3, on the frame unite 700, the DME engine 200 may be arranged so that one end faces the radiator unit 400, the power generation unit 300 may be arranged so that one end faces the other end of the DME engine 200, and the controller 600 may be arranged so that one end faces the other end of the power generation unit 300. In other words, on the frame unit 700, the arrangement may be in the order of [radiator unit 400]-[DME engine 200]-[power generation unit 300]-[controller 600].

As shown in FIG. 4, the DME supply unit 100 may include a DME fuel tank 110 in which the DME fuel is stored; a DME injection unit 120 configured to inject the DME fuel into the DME engine 200 by receiving the DME fuel from the DME fuel tank 110; a DME supply line 130 which is a flow path configured to deliver the DME fuel in the DME fuel tank 110 to the DME injection unit 120 in a liquid state; a DME recovery line 140 configured to recover the DME fuel remaining in the DME injection unit 120 in a state in which gaseous and liquid states coexist; a DME fuel tank valve 131 provided in the DME supply line 130 and configured to open or block the DME fuel discharged from the DME fuel tank; a DME fuel filter 132 provided downstream of the DME fuel tank valve 131 in the DME supply line 130 and configured to remove impurities in the DME fuel; a DME feed pump 133 provided downstream of the DME fuel filter 132 in the DME supply line 130 and configured to deliver the DME fuel to the DME injection unit 120; a DME fuel accumulator 134 provided downstream of the DME feed pump 133 in the DME supply line 130 and configured to reduce pulsation caused by the DME feed pump 133; a DME fuel pressure regulator 135 provided downstream of the DME fuel accumulator 134 in the DME supply line 130; a DME fuel solenoid valve 136 provided downstream of the DME fuel pressure regulator 135 in the DME supply line 130; a DME fuel cooler 141 provided in the DME recovery line 140 to cool the recovered DME fuel; and a DME fuel purge unit 142 provided in the DME recovery line 140 to purge a portion of the recovered DME fuel.

The DME fuel supplied from the DME fuel tank 110 may be delivered to the DME injection unit 120 through the DME supply line 130. The DME injection unit 120 may include an injector for injecting DME fuel into the DME engine 200 and a high pressure pump for providing pressure to the injector. The DME injection unit 120 may deliver the remaining amount of DME fuel remaining after DME fuel injection into the DME engine 200 back to the DME fuel tank 110 through the DME recovery line 140.

DME fuel may be stored in a liquid state in the DME fuel tank 110, and the DME fuel may be stored in a state with a liquid level of a certain height within the DME fuel tank 110.

The DME fuel tank valve 131 may be provided in the DME supply line 130 and may open or block the DME fuel discharged from the DME fuel tank. The DME fuel tank valve 131 may be equipped with a sealing member optimized for DME fuel. A plurality of the DME fuel tank valves 131 may be provided, and the plurality of DME fuel tank valves 131 may be connected in parallel on the DME supply line 130.

The DME fuel filter 132 may be provided downstream of the DME fuel tank valve 131 in the DME supply line 130 and may remove impurities in the DME fuel. The DME fuel filter 132 may be for removing impurities larger than 10 microns in DME fuel.

The DME feed pump 133 may be provided downstream of the DME fuel filter 132 in the DME supply line 130 and may deliver the DME fuel to the DME injection unit 120. In other words, the DME feed pump 133 may be used to deliver DME fuel from the DME fuel tank 110 to the high pressure pump of the DME injection unit 120. A temperature sensor may provided in the DME feed pump 133, so that the temperature of the DME feed pump 133 itself may be maintained below a certain temperature.

The DME fuel accumulator 134 may be provided downstream of the DME feed pump 133 in the DME supply line 130 and may be for reducing pulsation caused by the DME feed pump 133.

The DME fuel pressure regulator 135 may be provided downstream of the DME fuel accumulator 134 in the DME supply line 130, and may be for appropriately controlling the supply pressure of DME fuel from the DME feed pump 133 to the high pressure pump of the DME injection unit 120.

The DME fuel solenoid valve 136 may be provided downstream of the DME fuel pressure regulator 135 in the DME supply line 130, and may operate when the DME engine 200 is stopped and operated to determine blocking and supply of DME fuel.

The DME fuel cooler 141 may be provided in the DME recovery line 140 to cool the recovered DME fuel. Specifically, the DME fuel recovered from the DME injection unit 120 is at high temperature and pressure, and the DME fuel cooler 141 may cool it.

The DME fuel purge unit 142 may be provided in the DME recovery line 140 to purge a portion of the recovered DME fuel. In the case of DME fuel, it is a compressible fuel and when the temperature rises, the engine may not start because the DME fuel exists in a highly compressible gaseous state. To prevent this, by purging some of the fuel in the DME recovery line 140, the pressure in the DME supply line 130 may be lowered to improve startability.

The DME supply unit 100 may further include a DME feed pump cooler 133*a* configured to cool the DME feed pump 133. In order to prevent the DME fuel from being vaporized at high temperature, the DME feed pump cooler 133*a* may prevent the temperature of the DME feed pump 133 itself from increasing in a situation where the DME fuel is fed at high pressure.

The DME recovery line 140 may be connected to the DME fuel tank 110 at a position higher than the liquid level formed by the DME fuel in the liquid state stored inside the DME fuel tank 110. The DME supply line 130 may be connected to the DME fuel tank 110 at a position lower than the liquid level formed by the DME fuel in the liquid state stored inside the DME fuel tank 110.

Although embodiments according to the present disclosure have been described above, they are merely illustrative, and those skilled in the art will understand that various modifications and embodiments of an equivalent scope are possible therefrom. Therefore, the true technical protection scope of the present disclosure should be determined by the appended claims.

EXPLANATION OF SYMBOLS

100 . . . DME supply unit 110 . . . DME fuel tank
120 . . . DME injection unit 130 . . . DME supply line
131 . . . DME fuel tank valve 132 . . . DME fuel filter
133 . . . DME feed pump 133*a* . . . DME feed pump cooler 134 . . . DME fuel accumulator 135 . . . DME fuel pressure regulator
136 . . . DME fuel solenoid valve 140 . . . DME recovery line
141 . . . DME fuel cooler 142 . . . DME fuel purge unit
200 . . . DME engine 300 . . . Power generation unit
400 . . . Radiator unit 500 . . . Exhaust pipe
600 . . . Controller 700 . . . Frame unit

INDUSTRIAL APPLICABILITY

A DME-fueled generator of the present disclosure is driven by DME which is a clean fuel, and may generate electricity without generating environmental pollutants such as fine dust.

The invention claimed is:

1. A dimethyl ether (DME)-fueled generator comprising:
a power generation unit configured to generate electricity by receiving driving force;
a DME engine configured to generate the driving force by burning DME fuel; and
a DME supply unit configured to supply the DME fuel to the DME engine,
wherein the DME supply unit comprises:
a DME fuel tank in which the DME fuel is stored;
a DME injection unit configured to inject the DME fuel into the DME engine by receiving the DME fuel from the DME fuel tank;
a DME supply line which is a flow path configured to deliver the DME fuel in the DME fuel tank to the DME injection unit in a liquid state;
a DME recovery line configured to recover the DME fuel remaining in the DME injection unit in a state in which gaseous and liquid states coexist;
a DME fuel tank valve provided in the DME supply line and configured to open or block the DME fuel discharged from the DME fuel tank;
a DME fuel filter provided downstream of the DME fuel tank valve in the DME supply line and configured to remove impurities in the DME fuel;
a DME feed pump provided downstream of the DME fuel filter in the DME supply line and configured to deliver the DME fuel to the DME injection unit;
a DME fuel accumulator provided downstream of the DME feed pump in the DME supply line and configured to reduce pulsation caused by the DME feed pump;
a DME fuel pressure regulator provided downstream of the DME fuel accumulator in the DME supply line;
a DME fuel solenoid valve provided downstream of the DME fuel pressure regulator in the DME supply line;
a DME fuel cooler provided in the DME recovery line to cool the recovered DME fuel; and
a DME fuel purge unit provided in the DME recovery line to purge a portion of the recovered DME fuel,
wherein the DME supply unit further comprises a DME feed pump cooler configured to cool the DME feed pump,
wherein a plurality of DME fuel tank valves are provided, and the plurality of DME fuel tank valves are connected in parallel on the DME supply line.

2. The DME-fueled generator of claim 1, further comprising:
a radiator unit configured to discharge heat generated from the DME engine to atmosphere;
an exhaust pipe configured to discharge combustion gas generated from the DME engine; and
a controller configured to control the power generation unit.

3. The DME-fueled generator of claim 2, further comprising:
a frame unit, wherein the power generation unit, the DME engine, the radiator unit, and the controller are mounted on an upper surface of the frame unit.

4. The DME-fueled generator of claim 3, wherein the frame unit comprises a damper, and the damper is configured to prevent vibration of ground from being transmitted to the power generation unit, the DME engine, the radiator unit, and the controller.

5. The DME-fueled generator of claim 3, wherein the DME engine is arranged so that one end faces the radiator unit,
the power generation unit is arranged so that one end faces the other end of the DME engine, and
the controller is arranged so that one end faces the other end of the power generation unit.

6. The DME-fueled generator of claim 1, wherein the DME recovery line is connected to the DME fuel tank at a position higher than a liquid level formed by the DME fuel in the liquid state stored inside the DME fuel tank.

7. The DME-fueled generator of claim 6, wherein the DME supply line is connected to the DME fuel tank at a position lower than the liquid level formed by the DME fuel in the liquid state stored inside the DME fuel tank.

* * * * *